J. H. STRIEDINGER & A. ZOLLER.
SUBMARINE LANTERN.
No. 177,172. Patented May 9, 1876.
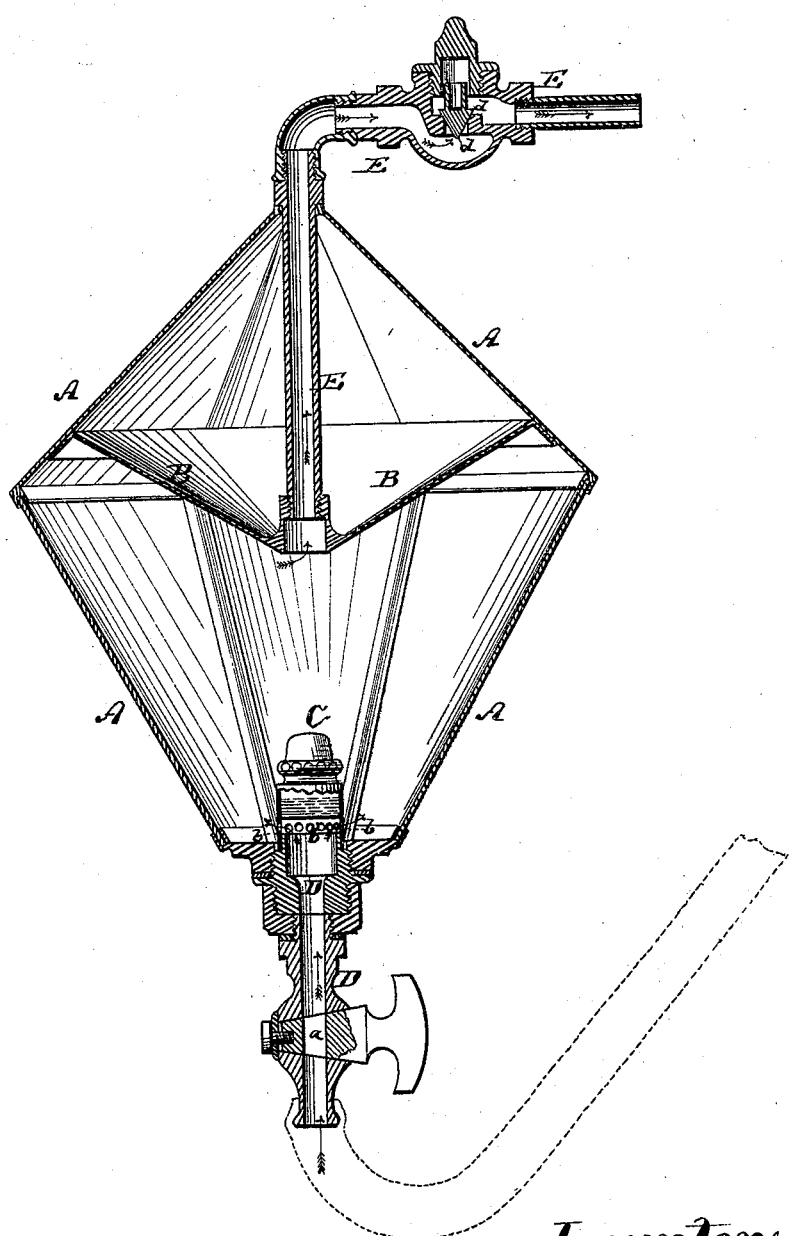
Witnesses:
A. Moraga
Ernest C. Webb
Inventors:
J. H. Striedinger
A. Zoller
by their attorney
A. v. Briesen

UNITED STATES PATENT OFFICE.

JULIUS H. STRIEDINGER, OF NEW YORK, N. Y., AND ALBERT ZOLLER, OF HOBOKEN, NEW JERSEY.

IMPROVEMENT IN SUBMARINE LANTERNS.

Specification forming part of Letters Patent No. 177,172, dated May 9, 1876; application filed April 5, 1876.

*To all whom it may concern:*

Be it known that we, JULIUS H. STRIEDINGER, of New York city, in the county and State of New York, and ALBERT ZOLLER, of Hoboken, in the county of Hudson and State of New Jersey, have invented a new and Improved Submarine Lantern, of which the following is a specification:

This invention has for its object so to construct a submarine lantern that it can be used in connection with a single air-supply tube, and without any tubing to lead the foul air above water.

Our invention consists in combining the submarine lantern with an air-discharge opening, in which a check-valve is placed, which will permit the escape of foul air from, but prevent the entrance of water into, the lantern, all as hereinafter more fully described.

In the accompanying drawing, the letter A represents the body of our submarine lantern. B is a reflector placed therein, and C the burner, candle, or other illuminating device, which, for greater convenience of description, we will simply term the "burner." This burner is placed in the lower part of the lantern, below the reflector, and the body of the lantern surrounding the burner is principally made of glass or other transparent substance. D is the air-supply pipe, entering the lower end of the lantern directly beneath the burner, and is, by preference, provided with a cock, $a$, to regulate the amount of air supplied. The upper end of the pipe D terminates in a chamber, $b$, which is directly beneath the burner, and of which the sides are perforated, so that the air which enters the lantern will be distributed by the apertures of the chamber $b$ equally around the burner and below the same, thus producing an upright and steady flame. E is an air-discharge pipe, extending from the center of the reflector B, or other convenient place, upward through the body A, and provided with a self-acting check-valve, $d$, which prevents the water from entering the lantern, but allows the air to escape freely.

In use, we propose to connect the supply-pipe D by elastic tubing with the air-pump usually employed by divers, so that the diver, in descending under water, may take the lamp with him, said lamp being, through the tubing and the pipe D, supplied with the requisite amount of oxygen to feed the flame; but the discharge-pipe E is to be entirely open to the water, and will, nevertheless, owing to the application of the valve $d$, prevent the water from entering the lantern.

Heretofore submarine lanterns were always provided with two tubes, both leading above the surface of the water; but with our invention one of these tubes can be dispensed with, thereby reducing the cost of the apparatus, and facilitating the handling of the same.

For lights not requiring the supply of air—as, for example, those in which the illuminating effect of heated wires is utilized—the air-pump connection may be dispensed with, and yet the discharge arrangement for the heated gases will even then be found most practicable and efficient.

We claim as our invention—

The combination of the submarine lantern A with the discharge-pipe E, which contains the check-valve $d$, all arranged substantially as described, so that the pipe E will discharge the foul or heated air directly into the water, as set forth.

JULIUS H. STRIEDINGER.
A. ZOLLER.

Witnesses:
ERNEST C. WEBB,
A. MORAGA.